United States Patent [19]

Ayers

[11] Patent Number: 4,539,107
[45] Date of Patent: Sep. 3, 1985

[54] PHASE SEPARATION DETECTING FILTER

[76] Inventor: William R. Ayers, P.O. Box 127, Bement, Ill. 61813

[21] Appl. No.: 631,891

[22] Filed: Jul. 13, 1984

[51] Int. Cl.³ .............................................. B01D 15/00
[52] U.S. Cl. ................................ 210/96.1; 210/416.4; 210/437; 210/493.1; 210/502.1; 210/503
[58] Field of Search ....................... 210/669, 689, 96.1, 210/256, 259, 261, 296, 315, 316, 416.4, 435, 437, 484, 493.1, 493.5, 497.01, 502.1, 503

[56] References Cited

U.S. PATENT DOCUMENTS

| | | | |
|---|---|---|---|
| 3,397,793 | 8/1968 | MacDonnell | 210/493.5 |
| 3,935,099 | 1/1976 | Weaver et al. | 210/689 |
| 4,026,792 | 5/1977 | Orth | 210/669 |
| 4,045,387 | 8/1977 | Fanta et al. | 210/689 |
| 4,364,825 | 12/1982 | Connor | 210/416.4 |
| 4,420,392 | 12/1983 | Harris | 210/416.4 |

Primary Examiner—Ivars Cintins
Attorney, Agent, or Firm—Wood, Dalton, Phillips, Mason & Rowe

[57] ABSTRACT

A filter for alternate use in filtering methanol-gasoline and ethanol-gasoline blends and sensing phase separation in either blend. The filter includes a composite filter media including a mechanical filter, a methanol sensing material and an ethanol sensing material. Both of the sensing materials are responsive to unduly high levels of the material being sensed in a corresponding blend and swelling to a substantially increased volume. The same are contained in a flow path such as to substantially block the flow path upon swelling of either or both of the sensing materials to thereby provide an indication of phase separation.

17 Claims, 1 Drawing Figure

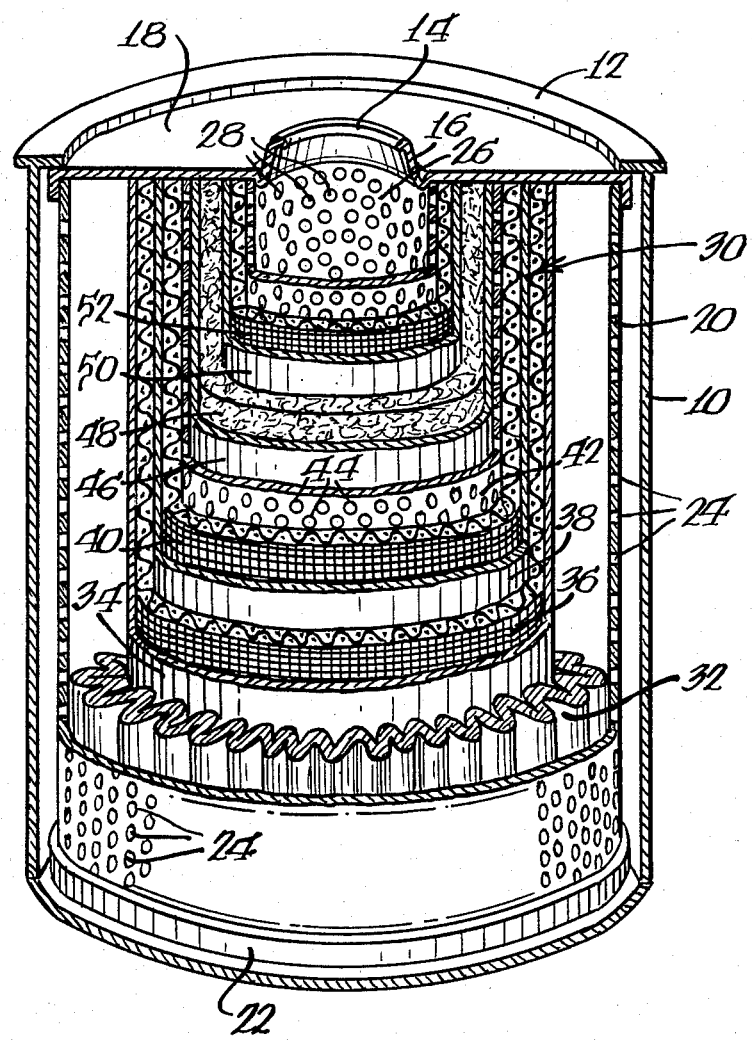

PHASE SEPARATION DETECTING FILTER

FIELD OF THE INVENTION

This invention relates to a filter for removing particulate material from petroleum products and for detecting phase separation therein. More specifically, the invention relates to a filter which detects phase separation in gasoline blends containing either methanol ethanol.

BACKGROUND ART

Recent years have seen a considerable upsurge in the use of so-called "gasohols" as fuel in spark ignition engines. It is generally considered that the introduction of such fuels occurred as a result of the so-called "energy crisis" in an attempt to find alternatives to pure petroleum fuel. By incorporating moderate percentages of alcohol in a fuel blend, a lesser requirement for gasoline resulted.

At least initially, ethanol was the most frequently used alcohol in such blends. However, because ethanol was more expensive than gasoline on a gallon for gallon basis, such blends were not widely received by the purchasing public unless the price of the blend was subsidized. As a consequence, the initial fervor with which such blends were received soon diminished.

In the same time period, legislation has been enacted mandating the use of unleaded fuels in more recently manufactured vehicles. The removal of lead from fuels for such vehicles lowered the octane rating of such fuel and a frequent complaint was that the use of unleaded fuels in the engines of such vehicles resulted in pre-ignition or knock. This in turn caused many purchasers to purchase premium unleaded fuels having a higher octane so as to avoid the consequences of pre-ignition. In the marketing structure, such premium unleaded fuels could easily be sold at a price higher than the unleaded regular fuels.

It has been recognized that the addition of alcohol to gasoline acts to increase the octane of the resulting blend. As a consequence, many so-called regular or premium unleaded fuels are now made with moderate amounts of alcohol. Where such fuels are sold as a premium grade fuel, and can therefore fetch a higher price on the market, the price disadvantage previously associated with ethanol containing blends was at least partially offset. Similarly where such fuels are sold as a regular grade, a lower octane and less expensive gasoline base may be utilized to offset the price disadvantage. Moreover, in the case of methanol, the same is, on a gallon for gallon basis, less expensive than gasoline with the consequence that unleaded blends employing methanol are made at extremely competitive prices.

Thus, in many locales today there are available as fuels, gasoline blends, containing methanol or ethanol wherein the alcohol (including other alcohols such as terryl butyl alcohol) typically is present to the extent of about 10%. Such blends can and are used interchangeably with pure gasoline as fuel in spark ignition engines without any substantial modification to the engine to accommodate the use of alcohol because of the presence of alcohol in only a moderate percentage.

However, at much higher alcohol percentages, such spark ignition engines will not run properly without major modification. This fact poses no difficulty in the use of blends as mentioned above so long as they are properly mixed.

A problem can arise, however, due to a phenomena known as "phase separation" that may occur in such blends. Phase separation occurs when water is present to a minor, but nonetheless significant degree in the fuel. Such water may be introduced into the fuel by condensation of humid air over the body of liquid constituting the blend in a storage tank, seepage of ground water into a storage tank, etc. When such phase separation occurs, stratification of the fuel blend within a storage tank takes place. In the case of gasoline blends containing methanol, the lowest layer will constitute methanol and water. The uppermost layer will be substantially pure gasoline while the intermediate layer will be the gasoline and methanol blend.

Where phase separation occurs in gasoline blends containing ethanol, a lower layer of ethanol and water will be formed along with an upper layer of gasoline.

In a typical gasoline storage system, as at a filling station, the inlet for the fuel pick-up tube will be near the lowermost reaches of the storage tank. Consequently, such inlet will typically be in an alcohol and water layer when phase separation has occurred. Consequently, fuel dispensed into a vehicle or the like from such tank will not be the desired alcohol-gasoline blend, but rather, will be an alcohol and water mixture. While the water may be present in sufficiently small amounts as to not, by itself, upset proper operation of the engine which is to be fueled, such engine will not operate properly when fueled with such mixture because of the high alcohol content thereof.

While means are available to detect phase separation, some difficulty may be experienced at a typical service station in employing such means due to the relatively unskilled help there employed. The problem is further complicated by the fact that a typical employee at such service station may be unaware of whether the blend in a given tank is a methanol-gasoline blend or an ethanol-gasoline blend. Consequently, means by which phase separation in an ethanol-gasoline may be detected may not suffice to indicate phase separation in a methanol-gasoline blend, and vice versa, such that unskilled labor can determine when phase separation has occurred.

The present invention is directed to overcoming one or more of the above problems.

SUMMARY OF THE INVENTION

It is the principal object of the invention to provide a new and improved filter with phase separation detecting qualities.

More specifically, it is an object of the invention to provide such a filter which can sense phase separation in either an ethanol-gasoline system or a methanol-gasoline system.

According to the invention, there is provided a composite filter media including a mechanical filtering material, a first swelling material capable of absorbing a water containing liquid and swelling to substantially increase its volume in response thereto, a second material capable of absorbing an alcohol rich liquid and swelling to substantially increase its volume in response thereto, and means including an inlet and an outlet housing the media and defining a flow path through the media between the inlet and the outlet which is at least partially blocked by swelling of either the first or second materials.

As a consequence, a decrease in the fluid flow through the filter is taken as an indication of phase separation such that the same can be dealt with appropriately.

In one embodiment of the invention, the first material swells in response to a water-ethanol mixture.

In one embodiment of the invention, the second material swells in response to a methanol rich liquid.

The invention contemplates that in a preferred embodiment, the first material is a starch-polyacrylonitrile graft copolymer. The second material is a polyacrylate.

In a highly preferred embodiment, the swelling materials are disposed in separate layers and the mechanical filtering material may be pleated filter paper.

In a highly preferred embodiment, the housing includes a canister provided with the inlet and the outlet. Within the canister is a filter structure which is in fluid communication with one of the inlet and the outlet and a central perforated tube which is within the filter structure as well as the canister and which is in fluid communication with the other of the inlet and the outlet. The filter structure and the tube and define a flow path between the inlet and the outlet and the filter materials and sensing materials are disposed in the filter structure outwardly of the tube.

Various means are employed to prevent migration of components of the filter media thus formed.

Other objects and advantages will become apparent from the following specification taken in connection with the accompanying drawings.

DESCRIPTION OF THE DRAWING

The FIGURE is a perspective view of a filter made according to the invention with certain parts broken away and other parts shown in section for clarity.

DESCRIPTION OF THE PREFERRED EMBODIMENT

An exemplary embodiment of a filter made according to the invention is illustrated in the FIGURE and is seen to include a housing 10 in the form of a conventionally shaped canister. The filter is adapted to be disposed in the flow path from a storage tank to a dispensing nozzle or the like. The illustration in the FIGURE omits the conventional mounting plate including the filter inlet and outlet that would be secured to the housing 10 by the flange 12 at the upper end thereof. Such a mounting plate is, as mentioned conventional and forms no part of the present invention. It is sufficient to note that the same would be provided with one opening placed in fluid communication with an opening 14 in a raised neck 16 on an imperforate plate 18 forming part of the filter. In the usual case, such an opening would serve as the outlet for the filter.

The mounting plate would include additional openings in fluid communication with the interior of the canister 10 exteriorly of a filter structure that may optionally be enclosed in a perforated, generally cylindrical can 20.

The bottom of the filter structure is closed by an imperforate cap 22 while perforations extend about the periphery of the can 20 if used are shown at 24, for example.

Aligned with the neck 16 and within the can 20 in concentric relation thereto is a tube 26 provided with perforations 28. The tube 26 has a considerably lesser diameter than does the can 20 as a consequence, a space between the two exists. A filter media, generally designated 30, made according to the invention is disposed in such space. Thus, the liquid to be filtered is introduced into the space between the canister 10 and the can 20 to flow generally radially inwardly via the perforations 24 and the can 20, through the filter media 30, out of the perforations 28 to the interior of the tube 26 and through the opening 14 in the neck 16 to the outlet in the mounting plate (not shown).

The filter media 30 includes three basic components. The first is a mechanical filter for removing particulate material in the liquid to be filtered. The second is a material that is responsive to a methanol rich liquid that will swell to a substantially increased volume. The third is a material that is responsive to an ethanol rich liquid caused by phase separation and which will swell in response thereto to a substantially increased volume. The latter materials are arranged to cross the flow path between the can 20 and the tube 26 such that upon swelling of either one or both, the flow path will be substantially obstructed to drastically decrease the flow path thereacross. Consequently, a decrease in flow through the filter is indicative of the fact that such swelling has occurred.

In the case of phase separation in a methanol-gasoline blend, the material responsive to a methanol rich liquid will provide the desired swelling action. In the case of phase separation in an ethanol-gasoline blend, the ethanol sensing material will provide the desired swelling. Thus, in both cases, the drastic reduction in flow rate through the filter is indicative of phase separation.

The main mechanical filtering action is provided by a radially outer filter paper layer 32 made of pleated filter paper which typically will be phenolic reinforced. Such material is conventionally employed in filters and forms no part of the present invention. If the can 20 is not used, the filter layer 32 will constitute the radially outermost part of the filter structure.

Immediately radially inwardly of the filter paper 32 is a layer of fibrous material 34. The layer 34 may be formed of most any desired material including glass fibers or polyester fibers. The latter is preferred as being less expensive. A typical fiber product that may be employed is that sold under the trade name Hollytex #3265 by Eaton-Dikeman.

Immediately radially inwardly of the layer 34 is a methanol sensing layer 36. The methanol sensing layer 36 is formed by a plastic screen to which is adhered particulate material capable of swelling to several times its volume upon absorption of methanol. A preferred material is a polyacrylate known as XD-8587.01 manufactured by the Dow Chemical Company. This material may swell to eleven times its normal volume upon absorption of pure methanol. It is even more effective where the methanol contains small amounts of water as will be the case when phase separation has occurred. A water content of 1-2% in the methanol may result in a sixteen fold swelling.

The polyacrylate may be affixed to the mesh by any suitable means. One particular convenient means is by sprinkling the material on the screen and creating a fine mist of methanol to cause the polyacrylate to become tacky enough to adhere to the screen.

In a preferred embodiment the polyacrylate is present on the screen to the extent of about 11 grams per square foot.

Immediately inwardly of the methanol sensing layer 36 is a media migration barrier which is formed by a wrap of fibrous material 38 about a wire screen 40. The fibrous material 38 may be fiberglass or polyester or any other suitable fiber. Again, for expense reasons, the previously identified Hollytex product is preferred. The fiber layer 38 prevents any polyacrylate that may disassociate itself from the layer 36 from passing radially inwardly in the flow path. The screen 40 assures uniform flow through all parts of the fiber layer 38.

The screen 40 is wrapped on a tube 42 having perforations 44 therein. The tube 42 is intermediate in size between the can 20 and the tube 26 and serves the purpose of confining further portions of the media 30 against the tube 26.

Immediately radially inwardly of the tube 42 is a tight fibrous wrap or layer 46. Again, this material may be fiberglass, polyester or any other suitable fibrous material. In the preferred embodiment, the wrap 10 is formed of material sold under the trade name Remay #2295 manufactured by E. I. DuPont and available from Eaton-Dikeman.

The wrap 46 is tightly disposed about an ethanol sensing layer 48. The ethanol sensing layer 48 is formed of fiberglass which acts as a carrier for a starch polyacrylonitrile graft co-polymer such as is disclosed in U.S. Pat. No. 3,935,099 issued Jan. 27, 1976 to Weaver et al and referred to in co-pending application Ser. No. 413,981 filed Sept. 2, 1982 entitled "Water Removing Filter Media and Method of Making the Same", William R. Ayers, inventor. The graft co-polymer may be dispersed in the glass fiber carrier, such as the AF-11 glass fiber product sold by Johns Manville, according to the method described in the previously identified Ayers application in a preferred embodiment, is present to the extent of about 20 grams per square foot.

Just inwardly of the ethanol sensing layer is an additional media migration barrier including a fibrous layer 50 and a wire screen layer 52, the latter abutting the tube 26. The media migration barrier defined by the layers 50 and 52 may be identical to that formed by the layers 38 and 40.

As mentioned previously, the fibrous layer 46 is relatively tightly wrapped around the sensing layer 48. This can be accomplished simply by hand tightening the wrap about such layer after the latter is disposed upon the media migration barrier which in turn has been disposed on the tube 26.

In a strict sense, the graft co-polymer employed in the ethanol sensing layer 48 is not responsive to pure ethanol to swell to several times its normal volume and impede fluid flow through the filter. Rather, the same is responsive to water to achieve such swelling. Since phase separation is precipitated by water in the gasoline blend containing ethanol, and such water will be absorbed by the virtually anhydrous ethylene used in a typical ethanol-gasoline blend, the water that will necessarily be present in an ethanol rich liquid from it as a result of phase separation will provice sufficient swelling to result in the desired flow resistance.

With a filter made according to the invention and the preferred embodiment thereof as identified previously, when phase separation in a methanol-gasoline blend has occurred, the pressure differential across the filter will increase from 4½ psi to 15 psi causing a decrease in flow from approximately 12 gallons a minute to less than 2 gallons a minute in approximately 30 seconds. In the case of phase separation in an ethanol-gasoline blend, the same change in pressure and flow rate will occur in approximately 20 seconds.

As noted previously, the can 20 is optional. Most frequently, it will be omitted entirely as the pleated filter paper forming the layer 32 will possess sufficient rigidity as to not require any greater confinement than that provided by the flanges on the pleat 18 and cap 22 shown in the drawing.

It will also be appreciated that the best mode of the invention is not restricted to the use of gasoline blends containing solely ethanol or methanol but may be used with efficacy where other additives in addition to ethanol or methanol, such as terryl butyl alcohol, form part of the blend.

From the foregoing, it will be seen that a filter made according to the invention is ideally suited for use in the dispensing of alcohol-gasoline blends at service stations. The operator of the service station need not concern himself with whether a methanol-gasoline blend or an ethanol-gasoline blend is being dispensed nor with phase separation detection since the filter will detect phase separation in either type of blend and drastically reduce the flow rate through the filter in a short period of time to provide an obvious and visual perception of the existence of phase separation. At the same time, desirable particulate removal is obtainable.

I claim:

1. A filter for sensing phase separation in an alcohol bearing gasoline product comprising:
 a composite filter media including:
 (a) a mechanical filtering layer;
 (b) a first swelling layer including a first material capable of absorbing a water containing liquid and swelling to substantially increase its volume in response thereto; and
 (c) a second swelling layer including a second material capable of absorbing an alcohol rich liquid and swelling to substantially increase its volume in response thereto; and
 means, including an inlet and an outlet, housing said media and defining a flow path through said media between said inlet and said outlet which is at least partially blocked by swelling of either of said first and second layers.

2. The filter of claim 1 wherein the swelling of said first material is responsive to a water-ethanol mixture.

3. The filter of claim 1 wherein the swelling of said second material is responsive to a methanol rich liquid.

4. The filter of claim 1 wherein the swelling of said first material is responsive to a water-ethanol mixture and the swelling of said second material is responsive to a methanol rich liquid.

5. The filter of claim 1 wherein said first material is a starch-polyacrylonitrile graft co-polymer.

6. The filter of claim 1 wherein said second material is a polyacrylate.

7. A filter for alternate use in filtering methanol-gasoline and ethanol-gasoline blends and sensing phase separation in either blend comprising:
 a composite filter media including
 (a) at least one mechanical filtering material for filtering particulate material from either blend;
 (b) a methanol sensing material responsive to an overly methanol rich methanol-gasoline blend by swelling to a substantially increased volume; and
 (c) an ethanol sensing material responsive to an overly ethanol rich ethanol-gasoline blend by swelling to a substantially increased volume; and
 means defining a flow path through said media;
 said media being disposed within said flow path so as to substantially block the same upon swelling of either or both of said sensing materials.

8. The filter of claim 7 wherein said materials are disposed in separate layers.

9. The filter of claim 7 wherein both of said sensing materials are absorbants.

10. The filter of claim 9 wherein said ethanol sensing material is a water absorbant responsive to dissolved water in ethanol.

11. A filter comprising:
a canister having an inlet and an outlet;
a central perforated tube within and spaced from said canister and in fluid communication with one of said inlet and outlet;
the space between said tube and said cannister being in fluid communication with the other of said inlet and said outlet and defining a flow path between said inlet and said outlet;
a pleated filter paper structure within said space about said tube;
a first layer in said space about said tube including a polyacrylate component; and
a second layer in said space about said tube including a starch polyacrylonitrile graft copolymer component.

12. The filter of claim 11 wherein said second layer comprises glass fibers carrying said graft copolymer and second first layer comprises a mesh-like material carrying said polyacrylate and further including fibrous layers immediately downstream of said first and second layers in said flow path for resisting movement of said graft copolymer and said polyacrylate in said flow path.

13. The filter of claim 12 wherein said canister and said tube sufficiently tightly confine said layers that swelling of either or both of said first and second layers will substantially reduce flow through said flow path.

14. The filter of claim 13 wherein said fibrous layers are backed by mesh or screen.

15. The filter of claim 14 wherein said tube is in fluid communication with said outlet and said space is in fluid communication with said inlet, said filter paper structure being radially outermost in said space and said second layer being radially inwardly of said first layer in said space.

16. A device for use in detecting phase separation in methanol-gasoline and ethanol-gasoline blends comprising:
a flow path for a blend; and
a media including;
(a) a methanol sensing material responsive to an overly methanol rich methanol-gasoline blend by swelling to a substantially increased volume, and
(b) an ethanol sensing material responsive to an overly ethanol rich ethanol-gasoline blend by swelling to a substantially increased volume; and
means defining a flow path through said media;
said media being disposed within said flow path so as to substantially block the same upon swelling of either or both of said sensing materials.

17. The device of claim 16 further including a mechanical filter disposed in said flow path.

* * * * *